Jan. 6, 1931.  N. A. CHRISTENSEN  1,787,614
BRAKE OPERATING MECHANISM
Filed July 9, 1928  2 Sheets-Sheet 1
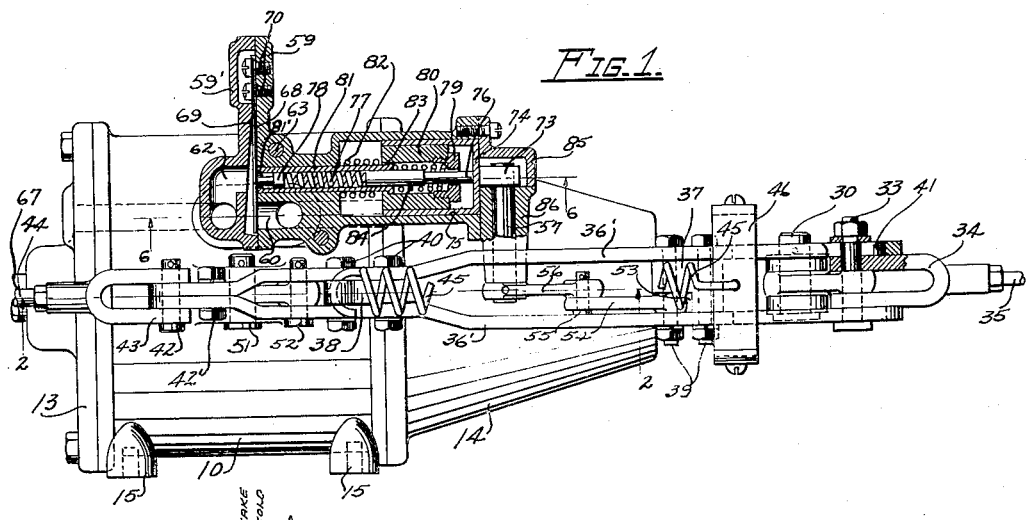
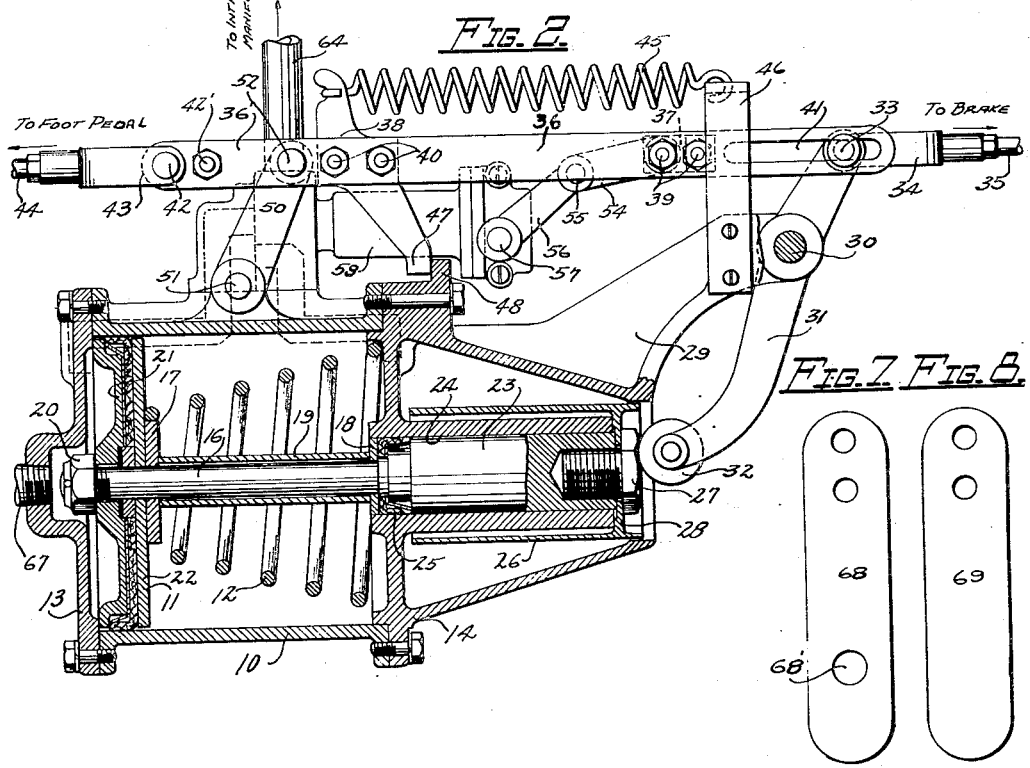
INVENTOR.
Niels A. Christensen
BY
Charles J. French
ATTORNEYS

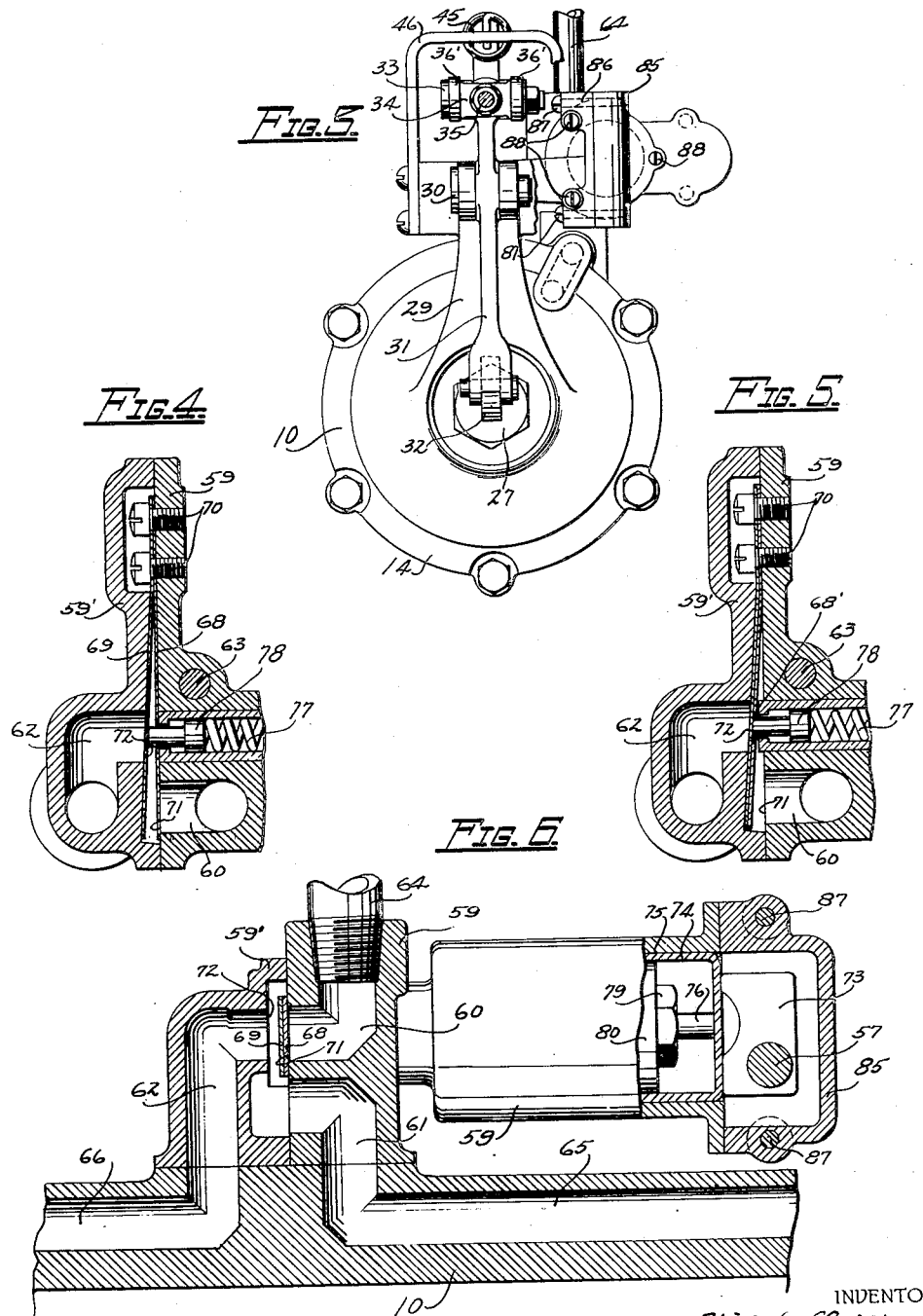

Patented Jan. 6, 1931

1,787,614

UNITED STATES PATENT OFFICE

NIELS A. CHRISTENSEN, OF CLEVELAND, OHIO

BRAKE-OPERATING MECHANISM

Application filed July 9, 1928. Serial No. 291,453.

The invention relates to brake operating mechanism for automotive vehicles.

The general object of the invention is to provide brake-operating mechanism of the general type of that of my prior United States Letters Patent No. 1,291,765, dated January 21, 1919, but more particularly where the power source of braking pressure is obtained by the suction or vacuum effect of the power plant of the vehicle.

More particularly, the invention is designed to provide a brake cylinder having a piston working therein, in which the suction pressure acts upon the back end of the piston and the thrust is transmitted through the piston-rod to the brake mechanism in such a way that the brake mechanism may also be manually operated, the valve mechanism for the brake cylinder also being under manual control.

The invention further consists in the several features hereinafter set forth and more particularly defined by claims at the conclusion hereof.

In the drawings Fig. 1 is a plan view of an apparatus embodying the invention, parts of the valve structure being shown in section and parts being broken away;

Fig. 2 is a side elevation view of the apparatus, with the brake cylinder shown in section, the section being taken along the line 2—2 of Fig. 1;

Fig. 3 is an elevation view of the rear end of the apparatus;

Figs. 4 and 5 are detail sectional views of the valve mechanism, showing it in different positions;

Fig. 6 is a detail view taken along the broken line 6—6;

Fig. 7 is a detail side elevation view of one of the valves;

Fig. 8 is a detail side elevation view of the other valve.

Referring to the drawings, the numeral 10 designates a brake cylinder having a suitably packed piston 11 working therein and normally urged to release position by a spring 12. The cylinder 10 has a removable front head 13 and a removable rear head 14, each secured to the cylinder barrel by bolts or other suitable fastening means, the cylinder having lugs 15 adapted to receive bolts for securing the same to the frame member or members of the chassis of the vehicle.

The piston 11 has a piston-rod in the form of a threaded rod 16 and washers 17, 18, and a sleeve 19 secured thereto by a nut 20 which clamps these parts together and to the plates 21 and 22 of the piston, and the enlarged end 23 of the rod 16 works in a bore 24 in the head 14 and has a packing cup 25 interposed between it and the washer or follower 18, said rod also having a dust shield 26 clamped thereto by a bolt 27 engaging a flange 28 of said shield interposed between the end of said rod 16 and the head of said bolt.

A bracket arm 29 is formed integral with or secured to the head 14 and its bifurcated end carries a pivot-pin 30 upon which a lever 31 is pivoted intermediate its ends. One end of said lever 31 carries a roller 32 engageable with the head of the bolt 27 and the other end of said lever carries a bolt or pin 33 which passes through the arms of a clevis 34 that has a screw connection with the brake-rod 35 adapted to be connected to the brakes of the vehicle in any suitable or well known manner, it being noted that the brake release mechanism acts upon the rod 35 to move the lever 31 to its release position, as shown in Fig. 2.

A manually-operated member 36 is in the form of a pair of bars 36' secured together and to a spacing block 37 and a member 38, respectively, by bolts 39 and 40. The spaced rear ends of the bars 36' are provided with slots 41 in which the pin or bolt 33 works and the converging front ends of said bars are connected by a bolt 42' and are connected by a pin 42 to a clevis 43 at one end of a rod 44 adapted to be connected to the foot or brake pedal of the vehicle. The member 36 is moved to a release position by a spring 45 connected at one end to a yoke 46 secured to the arm 29 and at its other end to the member 38, whose lower end 47 acts as a stop to engage a cooperative stop lug 48 on the brake cylinder to limit the movement of said member. An arm 50, pivoted on a pin 51 carried in lugs on the brake cylinder, is connected by a pin 52 with the bars 36' and acts to support the forward end of the member 36, while the lever 31 supports the rear end.

The block 37 is provided with a recess 53 receiving one end of a link 54 pivoted on one of the bolts 39, the other end of said link being connected by a pivot pin 55 to an arm 56 pinned or otherwise suitably secured to the shaft portion of a valve-operating lever 57.

The valve mechanism may be on any suitable construction but preferably includes features of the valve construction shown and described in my copending application Serial No. 279,338, filed May 21, 1928, with the modifications hereinafter described. This valve mechanism includes a two-part casing, one of said parts 59 being provided with ports 60 and 61 and the other part 59' being provided with a port 62. This casing is bolted to the brake cylinder by bolts 63. Port 60 is connected by a pipe 64 with the intake manifold (not shown) of the engine and port 61 connects with a passage 65 leading to the space at the back of the piston adjacent the head 14. Port 62 connects with a passage 66 in the brake cylinder leading to the space in front of the piston adjacent the head 13. The head 13 has an opening connected by a pipe 67 either with the crank case of the engine or with the atmosphere. Control of these ports is effected by a pair of superimposed, spring-leaf or plate valves 68 and 69, both of which are anchored at one end to the section 59 of the valve casing by screws 70, the valve 68 extending across the inner flat face of the casing and seating over the end or seat 71 of the port 60, the valve 69 being movable to seat against the inclined seat 72 of the port 62, the casing section 59' being recessed to accommodate this movement.

The valves are operated by the lever 57 which has a cam 73 engageable with a thimble or cup 74 slidably mounted in a bore 75 in the casing section 59 and engageable with and forming the head of a plunger 76 operatively connected by a spring 77, and shouldered pin 78, working freely through a hole 68' in the valve 68, with the valve 69 and operatively connected with the valve 68 by the engagement of cup 74 with another plunger formed by a bored cap-nut 79 through which the plunger 76 works, a sleeve 80 secured to said nut and slidably mounted in said cup 74 and associated with a tube 81 engaging said valve 68. This last-named plunger is moved to release position by a spring 82. The tube 81 has a flanged outer end, normally urged into engagement with the inner flanged end 83 of the sleeve 80 by a spring 84 interposed between the end of said nut and the flanged end of said tube. The plunger 76, spring 77 and pin 78 work in the bore of the tube 81 which is provided with an inturned flange or shoulder 81' to prevent pin 78 from falling out.

The open end of the bore 75 is enclosed by a two-part cover comprising parts 85 and 86 which are secured together by bolts or screws 87 and are secured to casing section 59 by bolts or screws 88, the shaft portion of the lever 57 being journalled in the part 86 of said cover. The removal of the cover with the operating lever carried thereby gives immediate access to the working parts associated with the casing section 59.

With this construction, when the operator steps on the foot pedal and thereby moves the member 36 to the left, as viewed in Fig. 2, the first movement of said member acts through the lever 56 and link 54 to turn the valve-operating lever 57 with cam 73 to operate the valve mechanism, while the lost motion connection afforded by the slots 41 permits this movement independent of the brake-rod 35. Thus the cam 73 is moved into engagement with the cup 74 and moves it, with the plunger 76, toward the left. This movement of the plunger 76 is transmitted by the spring 77 to the pin 78 which moves inwardly to move the valve 69 from the release position shown in Fig. 1 to the position shown in Fig. 4, thereby closing the release port 62. When this has taken place the spring 77 will be compressed to such an extent that the head of the cup engages the nut 79 of the second described plunger, when the other parts of said second plunger will be moved inwardly or forwardly against the pressure of the spring 82 by the pressure of spring 84 against the tubular stem 81 of this second plunger, thus moving the valve 69 off its seat 71, as shown in Fig. 5, and establishing communication between the ports 60 and 61 and thereby establishing communication between the intake manifold and the space in the brake cylinder at the back of the piston, and air will be drawn out of this space by the suction action of the engine and thus cause the piston to move rearwardly and through the rod 23, lever 31, pin 33, clevis 34 and rod 35 to apply the brakes. The relative movement between tube 81 and the sleeve 80, through the spring 84, permits of a continued travel of the sleeve 80, independent of the tube 81, and relieves the valve 69 and tube 81 of undue strains. If the operator then releases his pressure on the foot pedal slightly, so as to permit the tube 81 to travel back, away from the valve 68, said valve 68 will close and the valves 69 and 68 will then be in a lap position until such time as the operator again opens the inlet valve 68 or effects a complete release.

After the movement of the piston by the power source or in case the power source is not available a continued movement of the foot pedal will take up the lost motion between the member 36 and the brake-rod 35 by the engagement of the pin 33 with the outer ends of the slots 41 and the brake will be applied manually, this movement not being interfered with by the lever 31, since its roller-carrying end is then free to move away from the bolt 27.

On the release of the foot pedal the member 36 returns to release position under the action of the spring 45, thereby moving the valve-operating lever 57 to release position, the piston 11 moves to release position under the action of the spring 12 and the release springs of the brakes move the rod 35 to release position and, through the pin 33, causes the lever 31 to return to a release position. Movement of the lever 57 to a release position permits the springs 77, 82 and 84 to move the parts associated therewith to release position and the valves 68 and 69 are then free to move back to release position under their own resiliency, the suction action at the port 60 also assisting in holding the valve 68 firmly against its seat. As soon as the valve 69 moves off its seat 72, air under atmospheric pressure is free to pass direct from atmosphere or through the crank case of the engine through pipe 67 and the space in front of the piston and thence by way of passage 66, ports 62 and 61 and passage 65 to the other side of the piston, thereby equalizing the pressure on opposite sides of the piston and permitting the spring 12 to move the piston to its release position.

I desire it to be understood that this invention is not to be limited to any particular form or arrangement of parts except insofar as such limitations are included in the claims. What I claim as my invention is:

1. In brake-operating mechanism for automotive vehicles, control valve mechanism for the pressure-responsive brake-operating member comprising a casing provided with a release port, a suction inlet port and a brake cylinder port communicating with said release and inlet ports, superimposed inlet and release leaf spring valves mounted in said casing and respectively controlling said inlet and release ports, and a yieldable plunger for operating each valve, the plunger for operating the release valve including a pin working through an opening in said inlet valve, the plunger for operating said release valve including a tubular member having a stop shoulder cooperating with said pin.

2. In brake-operating mechanism for automotive vehicles, control valve mechanism for the pressure-responsive, brake-operating member comprising a casing provided with a release port, a suction inlet port and a brake cylinder port communicating with said release and inlet ports, superimposed inlet and release leaf spring valves mounted in said casing and respectively controlling said inlet and release ports, a yieldable plunger for operating each valve, the plunger for operating the release valve including pins and a spring interposed between said pins, the plunger for operating said inlet valve including relatively movable tubular members in which the parts of the release-valve-operating plunger works, and a spring between said members, and a thimble slidably mounted in said casing in which one of said tubular members is slidably mounted and engageable with said member and with one of the pins of said release-valve-operating plunger.

3. In brake-operating mechanism for automotive vehicles, control valve mechanism for the pressure-responsive, brake-operating member comprising a casing provided with a release port, a suction inlet port and a brake cylinder port communicating with said release and inlet ports, superimposed inlet and release leaf spring valves mounted in said casing and respectively controlling said inlet and release ports, a yieldable plunger for operating each valve, a thimble engageable with said plungers, and an operating cam engaging said thimble.

4. In brake-operating mechanism for automotive vehicles, the combination with a brake cylinder, a piston working in said cylinder and having a rod working through the rear end of the brake cylinder, a brake-actuating lever associated with said piston rod, a manually-controlled member associated with said brake-actuating lever, valve mechanism for connecting said brake cylinder with the atmosphere or with the intake manifold of the engine including a pair of superimposed valves and yieldable plungers for respectively operating said valves, and means connecting said plungers with said manually-controlled member for actuating said plungers.

In testimony whereof, I affix my signature.

NIELS A. CHRISTENSEN.